United States Patent
Sandven et al.

(10) Patent No.: US 7,210,056 B2
(45) Date of Patent: Apr. 24, 2007

(54) LOW LATENCY COMMA DETECTION AND CLOCK ALIGNMENT

(75) Inventors: Magne Sandven, Oslo (NO); Brian Manula, Oslo (NO); Morten Schanke, Oslo (NO)

(73) Assignee: Sun Microsystems, Inc., Santa Clara, CA (US)

( * ) Notice: Subject to any disclaimer, the term of this patent is extended or adjusted under 35 U.S.C. 154(b) by 494 days.

(21) Appl. No.: 10/863,374

(22) Filed: Jun. 8, 2004

(65) Prior Publication Data

US 2005/0273641 A1    Dec. 8, 2005

(51) Int. Cl.
G06F 1/10     (2006.01)
G06F 5/06     (2006.01)

(52) U.S. Cl. .................. 713/600; 709/224; 709/228; 709/232; 709/236; 710/58; 370/465; 341/95; 341/100

(58) Field of Classification Search ............... None
See application file for complete search history.

(56) References Cited

U.S. PATENT DOCUMENTS

| 6,201,829 | B1 * | 3/2001 | Schneider | 375/221 |
| 6,393,082 | B1 | 5/2002 | Nakamura | |
| 6,407,682 | B1 * | 6/2002 | Jones | 341/100 |
| 2003/0161429 | A1 | 8/2003 | Chiang | |

FOREIGN PATENT DOCUMENTS

WO    WO 02/089405 A2    11/2002
WO    WO 03/075477 A2    9/2003

OTHER PUBLICATIONS

XILINX: "Virtex-II Pro Platform FPGAs: Functional Description", Product Specification, Dec. 10, 2003, pp. 1-5, XP-002348226.
PCT International Search Report for International Application No. PCT/US2005/016775, 4 pages.
Written Opinion of the International Search Authority for International Application No. PCT/US2005/016775, 5 pages.

* cited by examiner

Primary Examiner—James K. Trujillo
Assistant Examiner—Anand B. Patel
(74) Attorney, Agent, or Firm—Park, Vaughan & Fleming LLP

(57) ABSTRACT

An Infiniband device can be provided. The device can comprise an input port having a serialiser/deserialiser. The serialiser/deserialiser can comprise: a data buffer for storing data from a received serial data stream and for outputting the stored data in parallel groups and a code detector for detecting a predetermined code pattern in the serial data stream and generating a code detection output in response thereto. The serialiser/deserialiser can also comprise a transition detector for detecting transitions in the serial data stream and reconstructing a serial data clock therefrom, and for generating a plurality of parallel data clocks from the serial data clock, each parallel data clock having a different phase. The data buffer can be responsive to the code detection output to adjust a parallel data group start position within the serial data stream and to cause a selection of one of the reduced frequency clocks having a phase corresponding to the adjusted parallel data group start position.

20 Claims, 10 Drawing Sheets

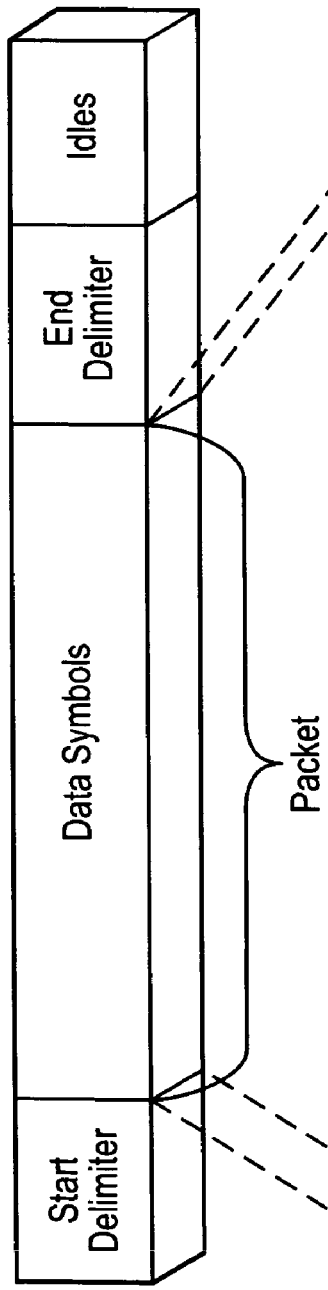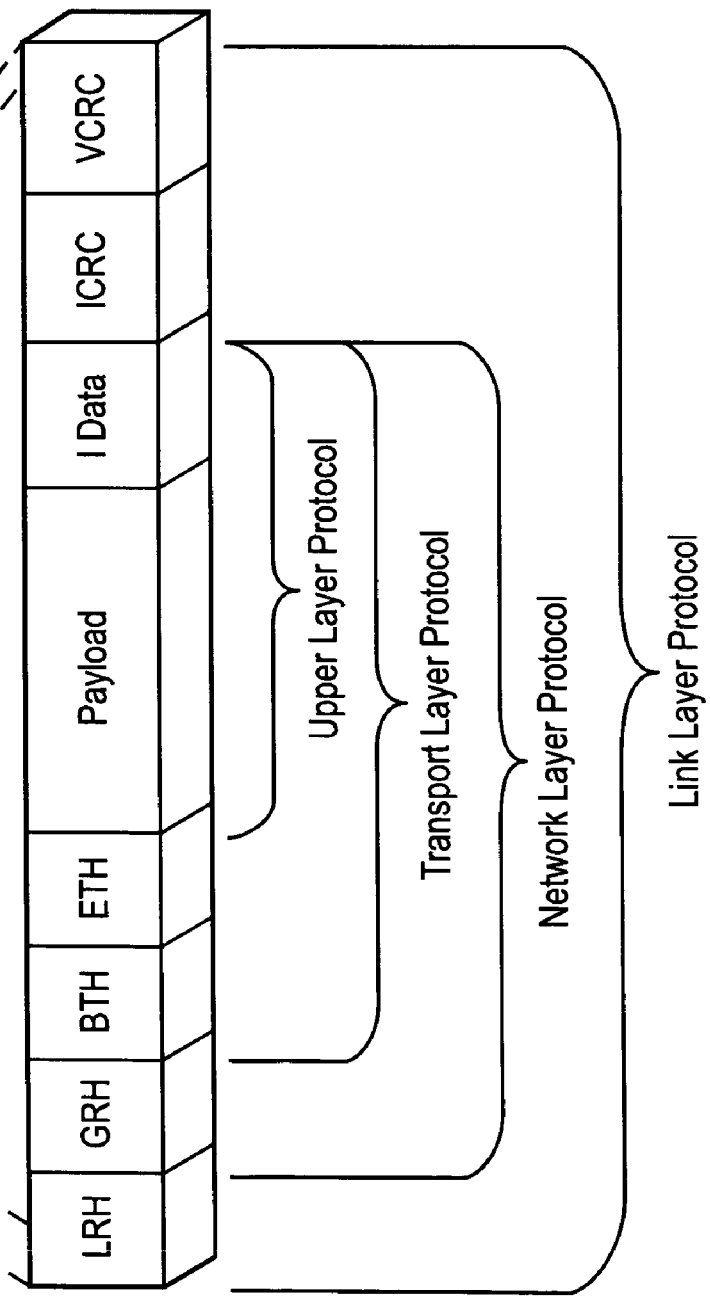

LOW LATENCY COMMA DETECTION AND CLOCK ALIGNMENT

RELATED APPLICATIONS

The present application is related to the following applications, all of which are filed on the same day and assigned to the same assignee as the present application:

"METHOD AND APPARATUS FOR VERIFYING SERVICE LEVEL IN A COMMUNICATIONS NETWORK" (Sun 040736), Inventors: Bjorn Dag Johnsen, Christopher Jackson, David Brean and Ola Torudbakken;

"SWITCH METHOD AND APPARATUS WITH CUT-THROUGH ROUTING FOR USE IN A COMMUNICATIONS NETWORK" (Sun 040743), Inventors: Bjorn Dag Johnsen, Hans Rygh and Morten Schanke;

"SWITCHING METHOD AND APPARATUS FOR USE IN A COMMUNICATIONS NETWORK" (Sun 040735), Inventors: Bjorn Dag Johnsen, Christopher Jackson, David Brean, Ola Torudbakken, Steinar Forsmo, Hans Rygh, Morten Schanke;

"METHOD AND APPARATUS FOR SOURCE AUTHENTICATION IN A COMMUNICATIONS NETWORK" (Sun 040734), Inventors: Bjorn Dag Johnsen, Christopher Jackson, David Brean, Ola Torudbakken;

"CREDIT ANNOUNCEMENT" (Sun 040719), Inventors: Morten Schanke, Hans Rygh, Marius Hansen and Mathias Hoddevik;

"ADAPTIVE CUT-THROUGH ALGORITHM" (Sun 040710), Inventors: Morten Schanke, Brian Manula and Magne Sandven;

"SERVICE LEVEL TO VIRTUAL LANE MAPPING" (Sun 040749), Inventors: Steinar Forsmo, Hans Rygh and Ola Torudbakken;

"INPUT AND OUTPUT BUFFERING" (Sun 040741), Inventors: Hans Rygh, Morten Schanke, Ola Torudbakken and Steinar Forsmo;

"CODEC IMPLEMENTATION FOR INFINIBAND" (Sun 040748), Inventors: Steinar Forsmo, Mathias Hoddevik and Magne Sandven;

"VCRC CHECKING AND GENERATION" (Sun 040725), Inventors: Steinar Forsmo, Hans Rygh, Morten Schanke and Ola Torudbakken;

"COMMUNITY SEPARATION ENFORCEMENT" Sun (040145), Inventors: Ola Torudbakken and Bjorn Dag Johnsen;

"STUMPING MECHANISM" Sun (040859), Inventors: Brian Manula, Ali Bozkaya and Magne Sandven.

The above-identified applications are all hereby incorporated by reference into the present application.

FIELD

The present invention relates to comma detection, and in particular but not exclusively to low latency comma detection and alignment in an Infiniband™ device such as a switch.

INTRODUCTION

In switches for Infiniband™ networks, there is a general requirement to reduce the latency through the switch such that transmission times of packets across the network can be reduced. When recovering the data stream from an Infiniband link, it is necessary to reconstruct the clock of the transmitted data from that data as no separate clock is transmitted. As the data stream is a serial stream, special sequences called "comma" sequences are inserted into the data stream by the transmitter to enable the receiver to identify the start of each 10 bit unit of data within the stream.

SUMMARY OF THE INVENTION

The present invention has been made, at least in parts, in consideration of problems and drawbacks of conventional systems.

Viewed from a first aspect, the present invention provides an Infiniband device. The device can comprise an input port having a serialiser/deserialiser. The serialiser/deserialiser can comprise: a data buffer for storing data from a received serial data stream and for outputting the stored data in parallel groups and a code detector for detecting a predetermined code pattern in the serial data stream and generating a code detection output in response thereto. The serialiser/deserialiser can also comprise a transition detector for detecting transitions in the serial data stream and reconstructing a serial data clock therefrom, and for generating a plurality of parallel data clocks from the serial data clock, each parallel data clock having a different phase. The data buffer can be responsive to the code detection output to adjust a parallel data group start position within the serial data stream and to cause a selection of one of the reduced frequency clocks having a phase corresponding to the adjusted parallel data group start position. This arrangement provides for a latency optimised recovery of data from an incoming data stream following comma detection. As the required low frequency clock is already generated, no time is wasted waiting for the correct clock to be generated.

Viewed from a second aspect, the present invention provides a data input port. The port can comprise an input buffer for receiving a serial data stream and for outputting a parallel data stream comprising multiple bits of said serial data stream in parallel groups. The port can also comprise a first detector unit for detecting a predetermined symbol in the data stream, and for outputting a positive detection status signal to the input buffer in response to a detection of said predetermined symbol; and a second detector unit for detecting data transitions in the serial data stream for generating a serial data clock signal and for generating a plurality of candidate clocks from the serial data clock signal, each candidate clock having the same frequency, the frequency being less than the frequency of the serial data clock signal. The input buffer can be operable to, upon reception of the positive detection status signal from the first detector unit, select a data ordering start position within the buffer for output of the parallel data stream and for outputting a clock selection signal for selecting between the plurality of candidate clocks on the basis of the selected data ordering start position. This arrangement provides a latency optimised system for valid data alignment following comma detection. A delay caused by waiting for a correct clock to be generated at an appropriate phase following comma detection can thus be avoided.

Particular and preferred aspects and embodiments of the invention are set out in the appended independent and dependent claims.

BRIEF DESCRIPTION OF FIGURES

Specific embodiments of the present invention will now be described by way of example only with reference to the accompanying figures in which:

FIG. 6 shows schematically the structure of a message to be transmitted via an Infiniband™ Architecture;

FIG. 7 shows schematically the format of a packet of the message of FIG. 6;

Figure 1:
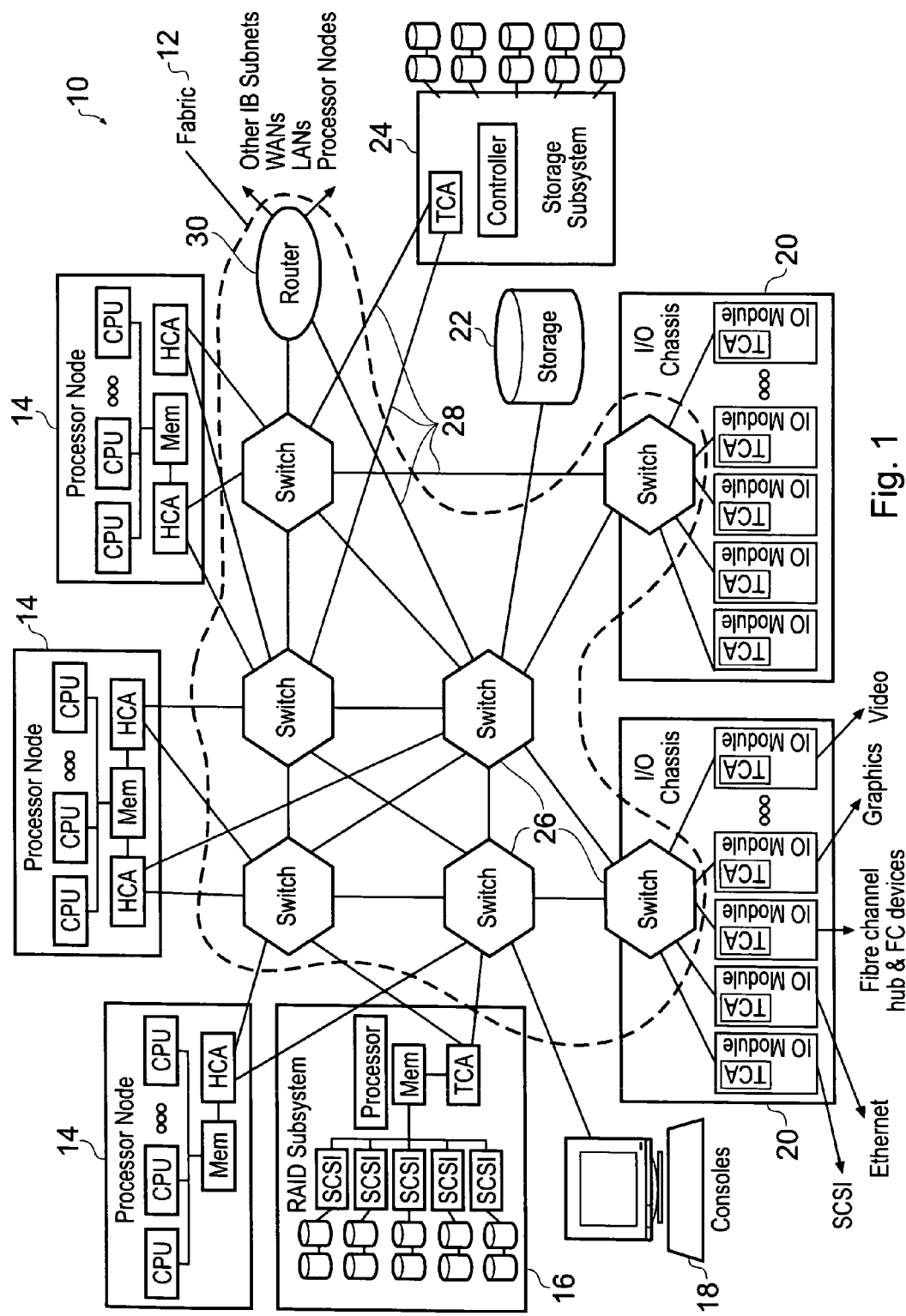
FIG. 1 is a schematic block diagram showing an example of interconnection of computing system elements via the Infiniband™ networking architecture.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DESCRIPTION OF SPECIFIC EMBODIMENTS

One particular computer networking architecture is the Infiniband™ architecture. Infiniband™ is a standard architecture defined and administered by the Infiniband™ Trade Association, which was founded by Compaq, Dell, Hewlett-Packard, IBM, Intel, Microsoft and Sun Microsystems. The Infiniband™ Architecture defines a System Area Network (SAN) for connecting multiple independent processor platforms (i.e. host processor nodes), I/O platforms and I/O devices. A full definition of the Infiniband™ Architecture may be found in the Infiniband™ Architecture Specification Volumes 1 and 2, available from the Infiniband™ Trade Association. Infiniband™ defines a standard for flexible and high speed interconnect between computing systems or parts of computing system such as processor and I/O nodes. Infiniband™ allows an order of magnitude more flexibility and scalability than conventional bus based systems through a highly hardware coupled and low latency interface, which is a key factor in multiprocessing architectures.

The Infiniband™ Architecture SAN is a communications and management infrastructure supporting both I/O and interprocessor communications for one or more computer systems. An Infiniband™ Architecture system can range from a small server with one processor and a few I/O devices to a massively parallel supercomputer installation with hundreds of processors and thousands of I/O devices.

The Infiniband™ Architecture defines a switched communications fabric allowing many devices to concurrently communicate with high bandwidth and low latency in a protected, remotely managed environment. An endnode can communicate with over multiple Infiniband™ Architecture ports and can utilise multiple paths through the Infiniband™ Architecture fabric. A multiplicity of Infiniband™ Architecture ports and paths through the network are provided for both fault tolerance and increased data transfer bandwidth.

Infiniband™ Architecture hardware off-loads from the CPU much of the I/O communications operation. This allows multiple concurrent communications without the traditional overhead associated with communicating protocols. The Infiniband™ Architecture SAN provides its I/O and interprocessor communications clients zero processor-copy data transfers, with no kernel involvement, and uses hardware to provide highly reliable, fault tolerant communications.

An example of an Infiniband™ Architecture System Area Network is shown in FIG. 1. As can be seen from FIG. 1, a System Area Network 10 comprises an Infiniband™ Architecture fabric (or Subnet) 12 made up of cascaded switches and routers. The fabric 12 provides links between a number of processor nodes 14 and other nodes including a Raid Subsystem 16, consoles 18, I/O Chassis 20, Storage 22 and a Storage Subsystem 24. The Fabric 12 is made up of a plurality of switches 26 having interconnections 28 providing data connections therebetween and between the nodes attached to the fabric 12. Also comprised in the fabric 12 is a router 30 for providing connections to and from other networks, which may be other Infiniband™ Architecture subnets, non-Infiniband™ Architecture LANs and WANs and/or processor nodes. I/O units connected via the fabric 12 may range in complexity from single ASIC devices such as a SCSI (small computer systems interface) or LAN adapter to large memory rich RAID subsystems that rival a processor node in complexity. Collectively, the processor nodes 14, raid subsystems 16, consoles 18, I/O Chassis 20, Storage 22 and Storage Subsystems 24 are known as endnodes 32.

Each endnode 32 has therein a Channel Adapter, which may be a Host Channel Adapter (HCA) or a Target Channel Adapter (TCA). Host Channel Adapters are to be found in processor nodes 14, and Target Channel Adapters are to be found in I/O Nodes 16, 18, 20, 22 and 24. Host Channel Adapters are configured to issue requests across the fabric 12, and Target Channel Adapters are configured to respond to such requests, for example by supplying requested data or storing supplied data. Each Channel Adapter uses a queuing system based on Queue Pairs, one queue for send operations and one for receive operations. Each Queue Pair may therefore be considered to provide a virtual communication port of a Channel Adapter. Each Channel Adapter may have up to $2^{24}$ Queue Pairs, which may be assigned individually or in combination to handle operations affecting different parts (or consumers) of the endnode 32. For example, a processor node 16 may comprise a plurality of processors and each processor may have one or more individual Queue Pairs assigned to handle requests and responses flowing to and from that processor of that processor node 16 via the fabric 12. Alternatively, or in addition, a processor of a given processor node 16 may be running more than one process and each process may have one or more Queue Pairs assigned to handle requests and responses flowing to and from that process via the fabric 12.

The interconnects 28 may be one of three classes, 1×, 4× or 12×, referring to the number of parallel lanes making up that interconnect. Each lane is a single serial connection over a single physical signal carrier path (whether electrical or optical). Thus the bandwidth available to each interconnect is defined by a combination of the number of lanes and the maximum data rate of the physical signal carrier making up each lane.

Figure 2:
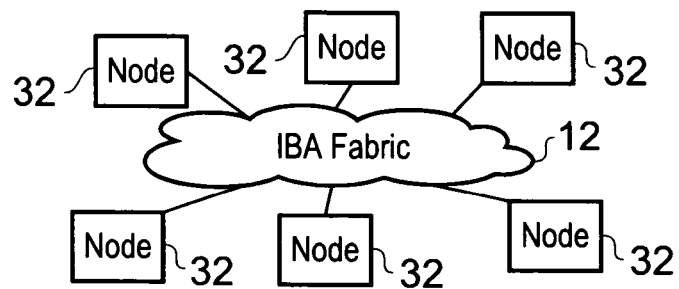
FIG. 2 is a schematic block diagram of a simplified arrangement of an Infiniband™ Architecture system.
Figure 3:
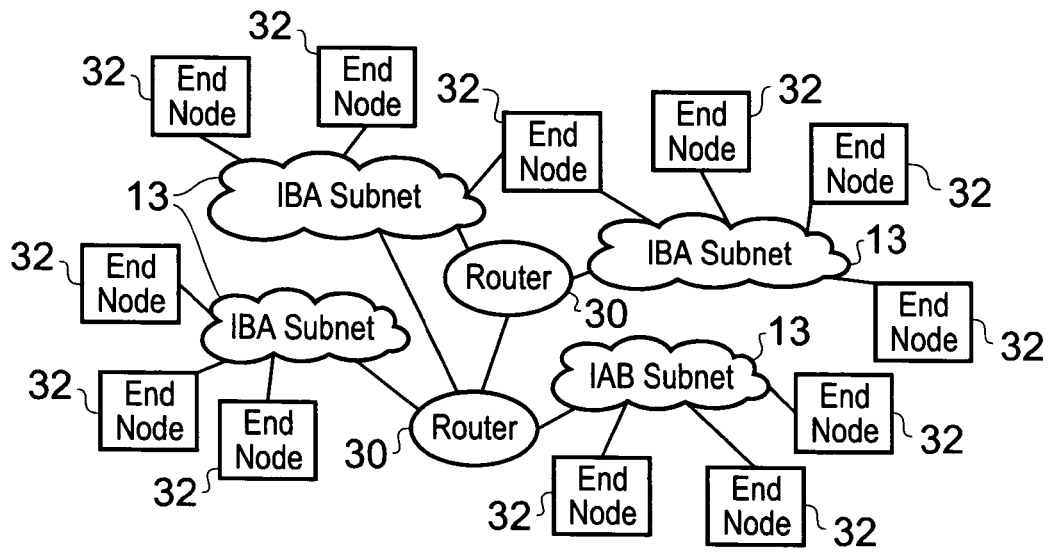
FIG. 3 is a schematic block diagram of another simplified arrangement of an Infiniband™ Architecture system.
Figure 4:
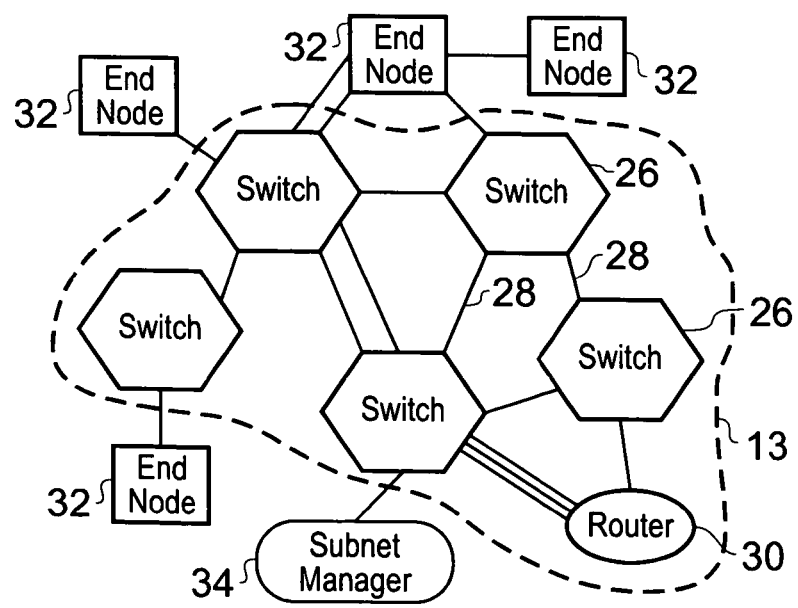
FIG. 4 is a schematic block diagram of a further simplified arrangement of an Infiniband™ Architecture system.

Examples of possible Infiniband™ Architecture topologies are shown in FIGS. 2, 3 and 4. FIG. 2 shows a high level simplified topology example where a number of endnodes 32 are interconnected by the fabric 12. An Infiniband™ Architecture network may be subdivided into subnets 13 interconnected by routers 30 as illustrated in FIG. 3. Any particular endnode 32 may be attached to a single subnet 13 or to multiple subnets 13. Shown in FIG. 4 is an example of the structure of a subnet 13. The subnet 13 comprises endnodes 32, switches 26, routers 30 and subnet managers 34 interconnected by links 28. Each endnode 32 may attach to a single switch 26, multiple switches 26 and/or directly with each other. In the case of direct connection between endnodes 32, the two or more directly linked endnodes effectively form an independent subnet with no connectivity to the remainder of the devices attached to the main subnet and one of the interconnected endnodes functions as the subnet manager for that link.

Figure 5:
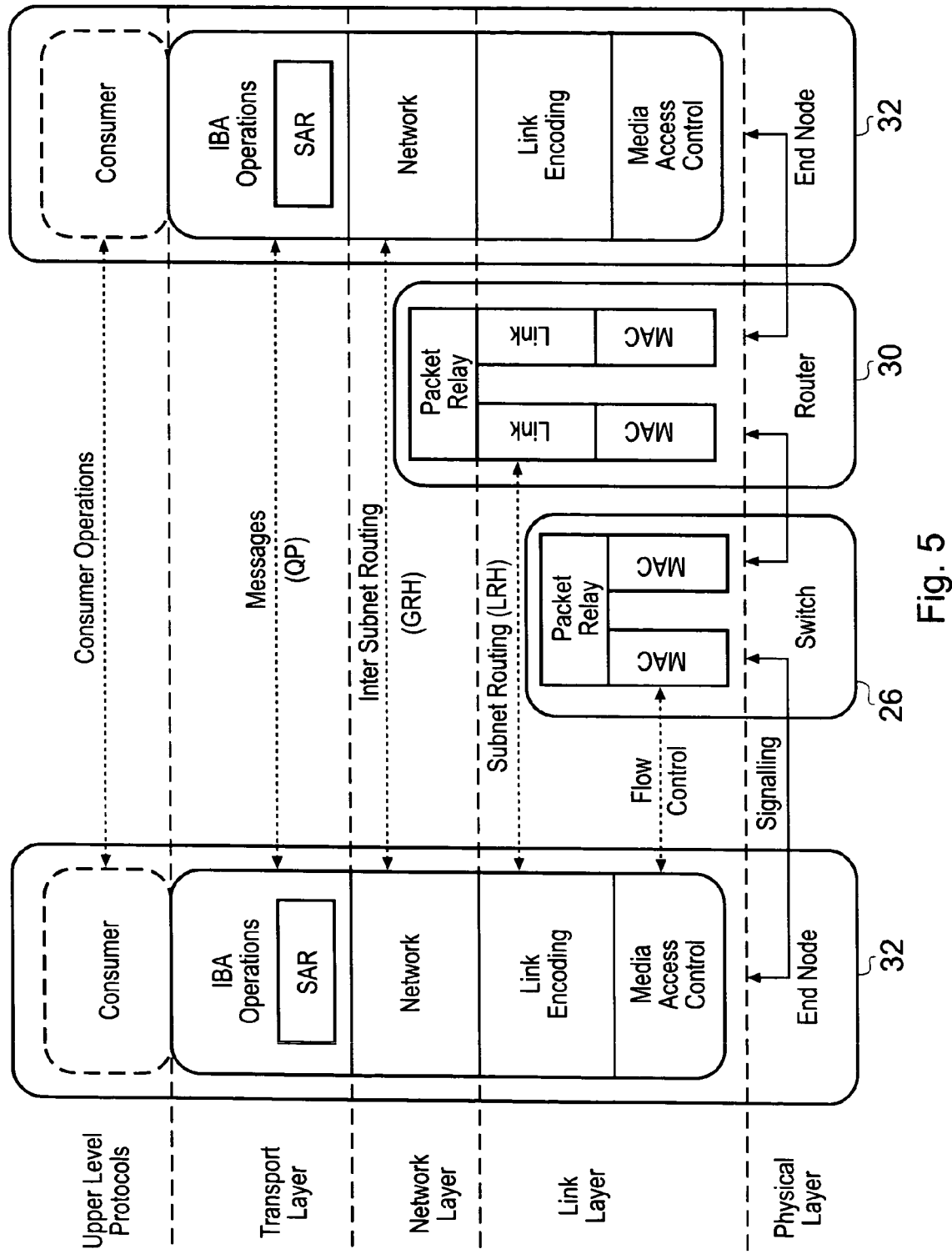
FIG. 5 shows a schematic illustration of the architecture layers of an Infiniband™ Architecture system.

Referring now to FIG. 5, there is shown an illustration of the architecture layers of an Infiniband™ Architecture system. Starting with the physical layer, this specifies how bits are placed onto the interconnections 28 and defines the symbols used for framing (i.e. start of packet and end of packet), data symbols and fill between packets (idles). It also specifies the signalling protocol as to what constitutes a validly formed packet (i.e. symbol encoding, proper alignment of framing symbols, no invalid or non-data symbols between start and end delimiter, no disparity errors, synchronisation method, etc.). The signalling protocol used by the Infiniband™ Architecture utilises a differential signal. The physical (or ethereal) interconnects 28 between nodes of an Infiniband™ Architecture network are normally provided by electrical signal carriers such as copper cables or optical signal carriers such as optical fibres. As discussed above, the maximum data rate of the interconnect is limited by the bandwidth of the selected channel. The physical layer also includes deskewing circuitry for compensating for skew latency in the channels.

The structure of a message to be transmitted through the fabric 12 via the interconnections 28 is illustrated in FIG. 6. As can be seen from FIG. 6, the message comprises a start delimiter, a packet comprising data symbols, an end delimiter and a number of idles.

The data packet format is illustrated in FIG. 7. Packets may be one of two types, IBA (Infiniband™ Architecture) Packets or RAW (non-Infiniband™ Architecture) Packets. IBA Packets have IBA defined transport headers, are routed on Infiniband™ Architecture fabrics 12, and use native Infiniband™ Architecture transport facilities. Raw Packets may be routed on IBA fabrics but do not contain Infiniband™ Architecture transport headers. From the Infiniband™ point of view, these packets contain only Infiniband™ routing headers, payload and CRC. Infiniband™ Architecture does not define the processing of these packets above the link and network layers. These packets can be used to support non-Infiniband™ Architecture transports (e.g. TCP/IP, IPX/SPX, NetBUI etc) over an Infiniband™ fabric.

The Link Layer describes the packet format and protocols for packet operation, e.g. flow control and how packets are routed within a subnet between the source and the destination. Packets may be data packets which convey data between endnodes and which consist of a number of different headers which may or may not be present. Alternatively packets may be Link Management Packets which are used to train and maintain link operation. These packets are used to negotiate operational parameters between the ports at each end of the link such as bit rate, link width etc. The link layer is responsible for flow control handling to prevent the loss of packets due to buffer overflow by the receiver at each end of a link. This mechanism does not describe end to end flow control such as might be utilised to prevent transmission of messages during periods when receive buffers are not posted. The terms "transmitter" and "receiver" are utilised to describe each end of a given link. The transmitter is the node sending data packets. The receiver is the consumer of the data packets. Each end of the link has a transmitter and a receiver. The Infiniband™ Architecture utilises an "absolute" credit based flow control scheme that is to say that Infiniband™ Architecture receivers provide a "credit limit". A credit limit is an indication of the total amount of data that the transmitter has been authorised to send since link initialisation.

Credit control is performed by a media access control (MAC) protocol. With respect to a given link, a receiver advertises (by means of a link packet) that credit is available, the amount of which is based on the current status of the receiver's receive buffers. The transmitter receives the link packet and determines how much transmit credit is available from the contents of the link packet. The transmitter then assigns itself the available credit and transmits data packets to the receiver while simultaneously decrementing its available credit count. The transmitter calculates its remaining available credit based on the initial figure determined from the receiver link packet and a record of how much data it has transmitted since that link packet was received.

Errors in transmission, in data packets, or in the exchange of flow control information can result in inconsistencies in the flow control state perceived by the transmitter and receiver. The Infiniband™ Architecture flow control mechanism provides for recovery from this condition. The transmitter periodically sends an indication of the total amount of data that it has sent since link initialisation. The receiver uses this data to re-synchronise the state between the receiver and transmitter.

As can be seen in FIG. 7, the Link Layer adds a Local Route Header (LRH) to the front of the packet and adds Invariant and Variant Cyclic Redundancy Checks (ICRC and VCRC) to the end of the packet. The Local Route Header is always present and identifies the local source and local destination where switches 26 will route the packet. The Invariant Cyclic Redundancy Check covers all fields within the packet which do not change as the message traverses the fabric. The Variant Cyclic Redundancy Check covers all the fields of the packet. The combination of the two CRCs allows switches 26 and routers 30 to modify appropriate fields and still maintain data integrity for the transport control and data portion of the packet.

The Network Layer, which is present only within routers 30 and endnodes 32, describes the protocol for routing a packet between subnets 13. Thus a Global Route Header (GRH) is present in a packet that traverses multiple subnets 13. The Global Route Header identifies the source and destination ports of the message. Routers 30 use the contents of the Global Route Header to determine the forwarding requirements of the message. As the message traverses different subnets 13 the routers 30 modify the content of the Global Route Header and replace the Local Route Header but the source and destination port identities are not changed and are protected by the Invariant Cyclic Redundancy Check. Thus the Network and Link Layers operate together to deliver a packet to the desired destination.

The Transport Layer, which is present only within endnodes 32, delivers the packet to the proper Queue Pair within the Channel Adapter of the destination endnode 32 and instructs that Queue Pair as to how the packet's data should be processed. The transport layer also has responsibility for segmenting an operation into multiple packets when the message's data payload is greater than the maximum payload carryable by a single packet. The receiving Queue Pair then reassembles the data from the multiple packets at the destination endnode 32. The transport layer adds up to two headers to the packet. The Base Transport Header (BTH) is present in all IBA Packets but not in RAW Packets. It identifies the destination Queue Pair and indicates an operation code, packet sequence number and specifies the operation (Send, Read, Write etc). A number of Extended Transport Headers (ETH) may be present conditional on the class of service and operation code.

The Packet Sequence Number is initialised for a given Queue Pair as part of the communications establishment process and increments each time that Queue Pair creates a new packet. The receiving Queue Pair tracks the received Packet Sequence Number to determine whether any packets have been lost. For reliable service, the receiver endnode 32 may transmit and acknowledge signal back to the originator endnode to indicate whether all packets have been received successfully.

The Upper Level Protocols are completely software based and may comprise any number of protocols used by various user consumers. The payload is the data carried by the packet and I Data is handling data associated with a work activity to be performed on the payload. Also present in the Upper Level protocols are Subnet Management and Subnet Services protocols. These protocols provide management structure including management messages for management of the subnet 13. Each subnet 13 requires only a single Subnet Manager application 34 which may be present in a dedicated node (as illustrated in FIG. 4) or may reside in another node, including a switch 26 or a router 30 as well as an endnode 32.

Figure 8:
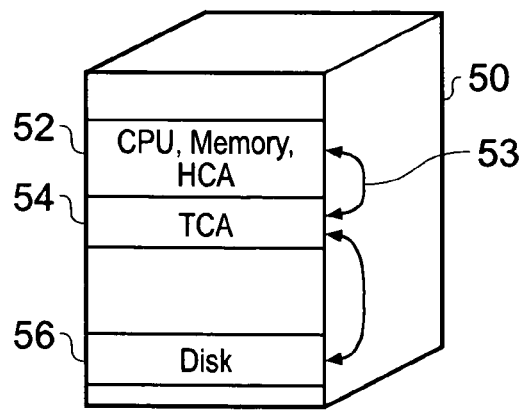
FIG. 8 is a schematic block diagram showing an arrangement where the Infiniband™ Architecture is used to interconnect components within a computer system.
Figure 9:
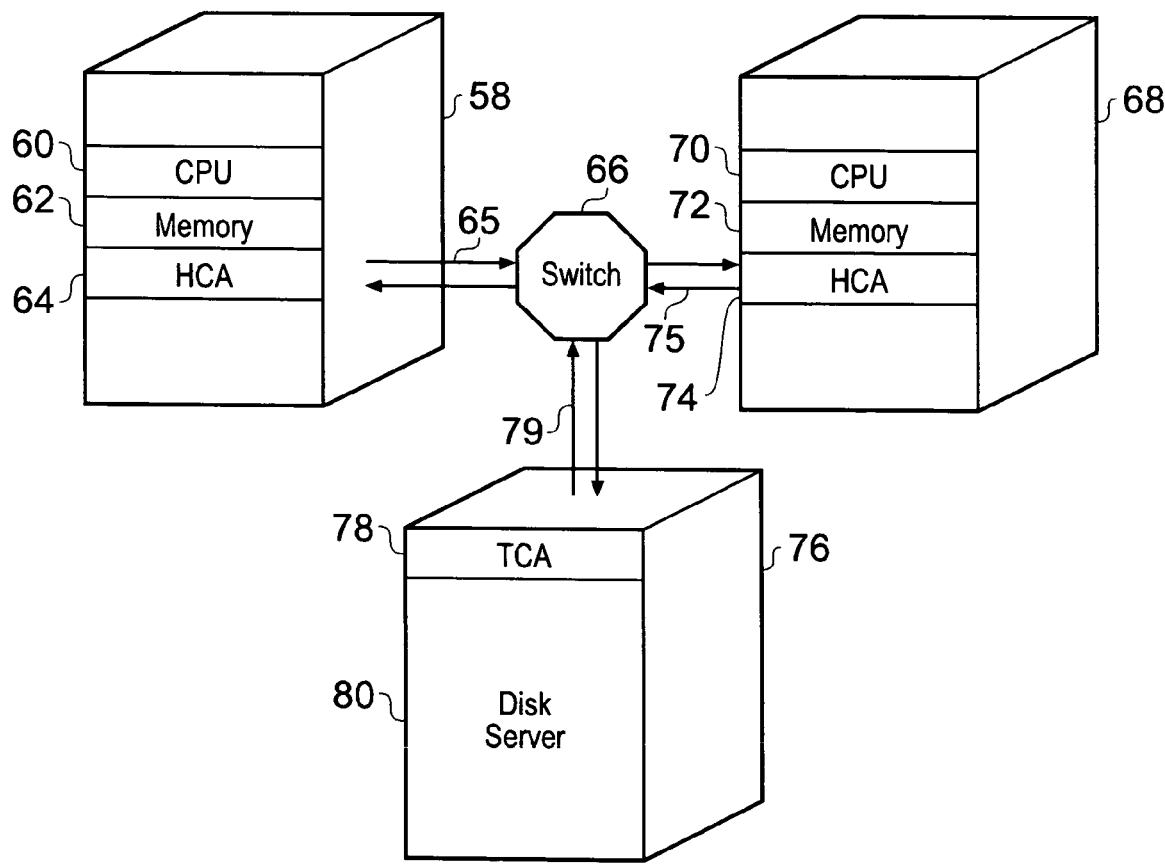
FIG. 9 is a schematic block diagram showing an arrangement where the Infiniband™ Architecture is used as an interconnect between computer systems.

Examples of simple Infiniband™ Architecture systems are shown in FIGS. 8 and 9. FIG. 8 shows an arrangement where the Infiniband™ Architecture is used to interconnect components within a standard computer system rack 50. In this example, the CPU, Memory and a Host Channel Adapter 52 are interconnected using conventional non-Infiniband™ Architecture techniques. The Host Channel Adapter of the CPU, Memory and Host Channel Adapter 52 communicates via an Infiniband™ Architecture interconnect 53 with a Target Channel Adapter 54. The Target Channel Adapter 54 communicates with a disk drive unit 56 via a SCSI (Small Computer System Interface) connection. Thus the Infiniband™ Architecture is configured in this example to facilitate communications between elements of the same computer system.

FIG. 9 shows an arrangement where the Infiniband™ Architecture is used only as an interconnect between computers. In this example a first computer system is mounted in a rack 58 and comprises a CPU 60, memory 62 and a Host Channel Adapter 64 interconnected via conventional non-Infiniband™ Architecture techniques. Via the Host Channel adapter 64, the first computer system communicates to and from a Switch 66 across interconnects 65. Also connected to the Switch 66 is a second computer system mounted in a rack 68 and comprising a CPU 70, memory 72 and a Host Channel Adapter 74 which connects to the switch 66 via interconnects 75. Data storage for the first and second computer systems is provided by a disk server 80 mounted in a rack 76. The disk server 80 connects with a Target Channel Adapter 78 also mounted within the rack 76 by conventional non-Infiniband™ Architecture techniques. The Target Channel Adapter 78 connects to the switch 66 via interconnects 79. Thus the Infiniband™ Architecture is configured in this example to facilitate communication between more than one distinct computer systems. There is no limitation that the techniques of the examples of FIGS. 8 and 9 should be practised separately, a computer system using the Infiniband™ Architecture for internal communications may also be connected to other computer systems via a network based on the Infiniband™ Architecture.

Thus there has now been described an overview of the Infiniband™ Architecture for computer networking with examples of how it may be put into practice. Further details may be found in the above referenced Infiniband™ Architecture Specification Volumes 1 and 2, available from the Infiniband™ Trade Association, the contents of which are hereby incorporated hereinto by reference.

Figure 10:
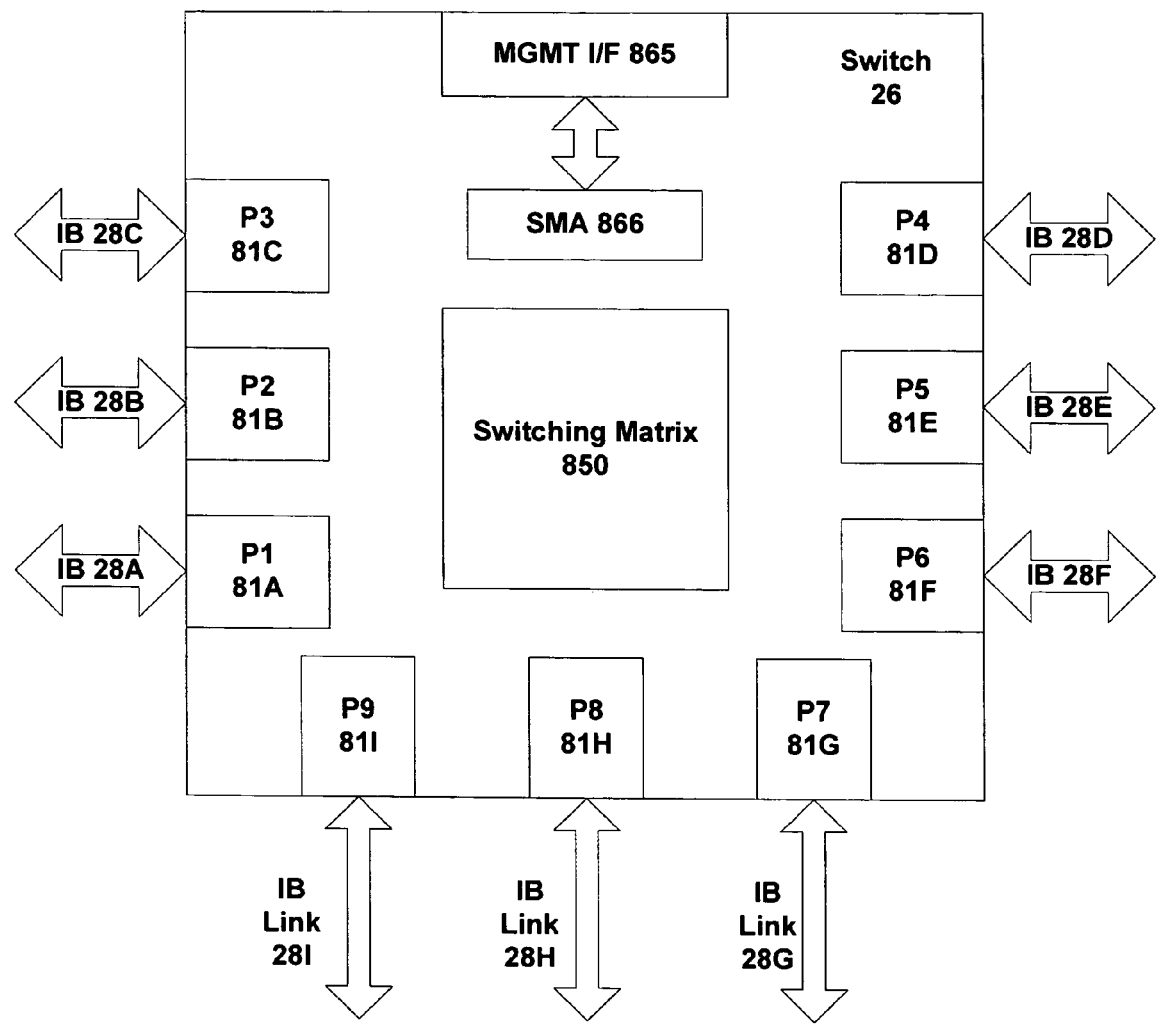
FIG. 10 is a schematic block diagram showing an example of a switch suitable for use in an Infiniband™ network.

FIG. 10 illustrates an example of a switch 26 suitable for use in an Infiniband fabric 12. Switch 26 can be implemented as a semiconductor device, for example an application specific integrated circuit (ASIC), and includes a management control interface 865, a subnet management agent (SMA) 866, multiple ports 81, and a switching matrix 850.

The management interface 865 provides access to the switch 26 for one or more external control systems, and can be used to configure switch 26 as appropriate depending upon the circumstances. For example, the subnet management agent 866 can communicate with the subnet manager 34 (see FIG. 4) via management interface 865.

In the present example, switch 26 has nine ports 81, denoted in FIG. 10 as P1 81A, P2 81B, P3 81C, P4 81D, P5 81E, P6 81F, P7 81G, P8 81H, and P9 81I. Each port is attached to a corresponding Infiniband duplex link 28 providing transmit (Tx) and receive (Rx) capability, and comprising one, four or twelve physical lanes. Each physical lane provides a basic data rate of 2.5 GHz, so that switch 26 provides connectivity for a total of 96 (9×12) lanes. The physical lanes into any given port are managed as a single logical link, and can be flow controlled using a credit-based link level flow control, as described above.

In accordance with the Infiniband Architecture, each link 28 can be subdivided into a maximum of sixteen virtual lanes (VL) to provide logically separate channels that are multiplexed onto a single logical link. The first fifteen virtual lanes (denoted VL0 through VL14) support general purpose data communications, while the remaining virtual lane (denoted VL15) is used for special management purposes. (Note that virtual lane VL15 is not flow-controlled, and so should be considered as not reliable). An Infiniband switch must support at least two virtual lanes on each link (i.e. data lane VL0 and management lane VL15). In one example, switch 26 supports four virtual lanes for general data communication plus one virtual lane for management purposes (VL15).

In accordance with the Infiniband Architecture, a packet can be specified as having one of sixteen different service levels (SLs). The service level for a particular packet is specified in the local route header (LRH), and remains constant as the packet transits an Infiniband subnet. The SL value in the packet determines the virtual lane over which the packet is transmitted across any given link in the subnet. This is achieved by having a switch maintain a set of SL-to-VL mappings (which are specific to each input port/output port combination). The SL-to-VL mappings are initialized and maintained by the subnet manager 34 (see FIG. 4).

On receipt of an incoming packet, a port first determines the output port to forward the packet to, based on the DLID value in the packet (as explained in more detail below). The port then uses the SL-to-VL mappings to decide the virtual lane over which the packet should be sent, given the SL value in the packet and the output port from which the packet will be transmitted. Note that since different switches may support different numbers of virtual lanes, a packet may be assigned to different virtual lanes for different links of its journey across a subnet.

The range of service levels can be used to provide a quality of service (QoS) mechanism in an Infiniband network. Thus any given virtual lane can be classified as low priority or high priority, and assigned a weight within that classification. The weight and classification of a virtual lane control its access to the bandwidth of the physical link, relative to the other virtual lanes supported over the same link. The service level of a packet then determines the virtual lane utilised by the packet over the link, in accordance with the SL-to-VL mappings. These mappings can be configured to reflect the number of virtual lanes provided by any given link and also the quality of service policy of the network.

The Infiniband Architecture supports the concept of partitioning in order to provide logical isolation of components sharing the same subnet. All nodes included in a route from a source to a destination must share the same 16-bit partition key (PK), otherwise they are unable to communicate with one another (or even to recognise each other's existence). An individual node may support multiple partition keys, and so belong to multiple different partitions.

A member of a partition can be denoted as a full member or a limited (partial) member, dependent on the high-order bit of the partition key. A full member can communicate with either a limited member or a full member, but a limited member cannot communicate with another limited member of that partition (only a full member). This model corresponds to a client-server architecture, where servers are full members and clients are partial members, and clients do not need generally to talk directly to one another.

Each queue pair at an end node has a partition key table which is assigned to it by the subnet manager 34 (see FIG. 4). A queue pair is assigned an index into the partition key table, and can then use this index to obtain and store the appropriate partition key into the local route header (LRH) for each outgoing packet. Conversely, a queue pair receiving a packet checks that the Pkey value within the incoming packet matches the indexed Pkey value in the Pkey table (if not, the incoming packet is discarded).

Each port 81 on switch 26 is provided with an input buffer (not shown in FIG. 10). The input buffer receives data arriving at a port 81 over its respective link 28, and stores this data pending transfer through the switching matrix 850. In the example mentioned above, each input buffer is divided into four sections, corresponding to the four virtual lanes on the associated link 28. This ensures that data from different virtual lanes is kept properly isolated.

Switching matrix 850 is used to transport data from one port to another. For example, if data arrives on link 28D at port P4 81D and is to be forwarded on link 28A, then switching matrix 850 is responsible for transferring the data from port P4 81D to port P1 81A (corresponding to link 28A). It will be appreciated that while ports 81 are constrained by the Infiniband standard (in order to ensure network connectivity), to some extent switching matrix 850 can be regarded as a more generic switching device, since it is internal to switch 26 and therefore shielded (at least in part) from other network devices.

The Infiniband architecture supports two general modes of communication. The first of these is unicast or point-to-point, in which each data packet goes from a single source to a single destination. This translates into switching matrix 850 transferring a packet from one incoming port to one outgoing port. The other mode of communication in Infiniband is multicast, in which a packet may be routed from a single source to multiple destinations. This is mirrored in the passage of the packet through switching matrix 850, whereby a packet from an incoming port may be directed to multiple outgoing ports.

It is desirable for the switch 26 to have low latency and high efficiency. A low latency implies relatively small amounts of buffering, otherwise delays through the switch will tend to increase. A high efficiency implies that the performance of the switch 26 is not degraded due to competition for resources within the chip as the load (i.e. the traffic through the switch) rises.

As part of the start-up procedure of an Infiniband network, the subnet manager 34 (see FIG. 4) assigns each end-node port in a subnet a local identifier (LID). Note that the individual ports 81 in switch 26 are not assigned their own LIDs, although an LID is assigned to port 0 of switch 26, which can be regarded as corresponding to management interface 865. (The switch management port, i.e. port 0, is considered an end-node in the Infiniband network, unlike the other switch ports).

Each LID comprises two portions, a base LID and a number of path bits. The number of path bits in the LID for a given port is determined by the LID mask count (LMC), which is also assigned by the subnet manager 34. Each packet in transit on the subnet contains the LID of the port from which it originated, namely the source LID (SLID), and also the LID for the port to which the packet is going, namely the destination LID (DLID). The SLID and the DLID are incorporated into the local route header (LRH) of the packet.

When a packet is received at its destination, the port checks that the DLID in the packet matches the LID for that port. Note that in this comparison the path bits of the LID are masked out, so that in effect the comparison is made against the base LID for the port. Thus for the purpose of destination checking, the path bits are ignored. However, in terms of routing a packet through a switch, the path bits are taken into consideration. This then allows multiple paths to be specified that all arrive at the same destination port. The ability to provide multiple paths through a subnet to the same destination port aids robustness and reliability within the network.

For transmission over an Infiniband link, data is encoded from 8 bit bytes (+1 control bit) into 10 bit units. The data is then serialised and transmitted over the link. At the receiver, the data is deserialised and then decoded back to the 8 bit byte plus control bit. No separate clock is transmitted with the data stream, so the receiver uses the transitions in the data stream (one of the reasons for using the 10 bit encoding is to ensure the existence of sufficient transitions) to reconstruct the clock of the stream. Thus the Infiniband high frequency clock can be easily recovered. This clock is at 2.5 GHz (the data transmission rate of the link). However, as will be appreciated, following deserialisation, the clock speed will drop by a factor of $\frac{1}{10}$ as the data is now moving in parallel units of 8 bits. Thus the Infiniband low frequency clock operates at 250 MHz.

In order to successfully recover the data from the transmitted data stream, there is a requirement to find the correct starting place for each 10 bit unit in the serial data stream. If the data units are started in an incorrect place, the data in the stream will be corrupted and useless. Accordingly, the Infiniband standard provides for the use of comma symbols to be inserted with the data stream. These symbols use unique bit patterns that do not occur anywhere within any combination of the 10 bit data codes used for the data encoding. The reception of such a symbol provides the receiver with an indication of where the 10 bit data units commence, allowing correct data extraction from the stream. The comma symbols, also allow a determination of which one of the ten possible low frequency clocks which can be recovered from the high frequency clock is the correct one.

Figure 11:
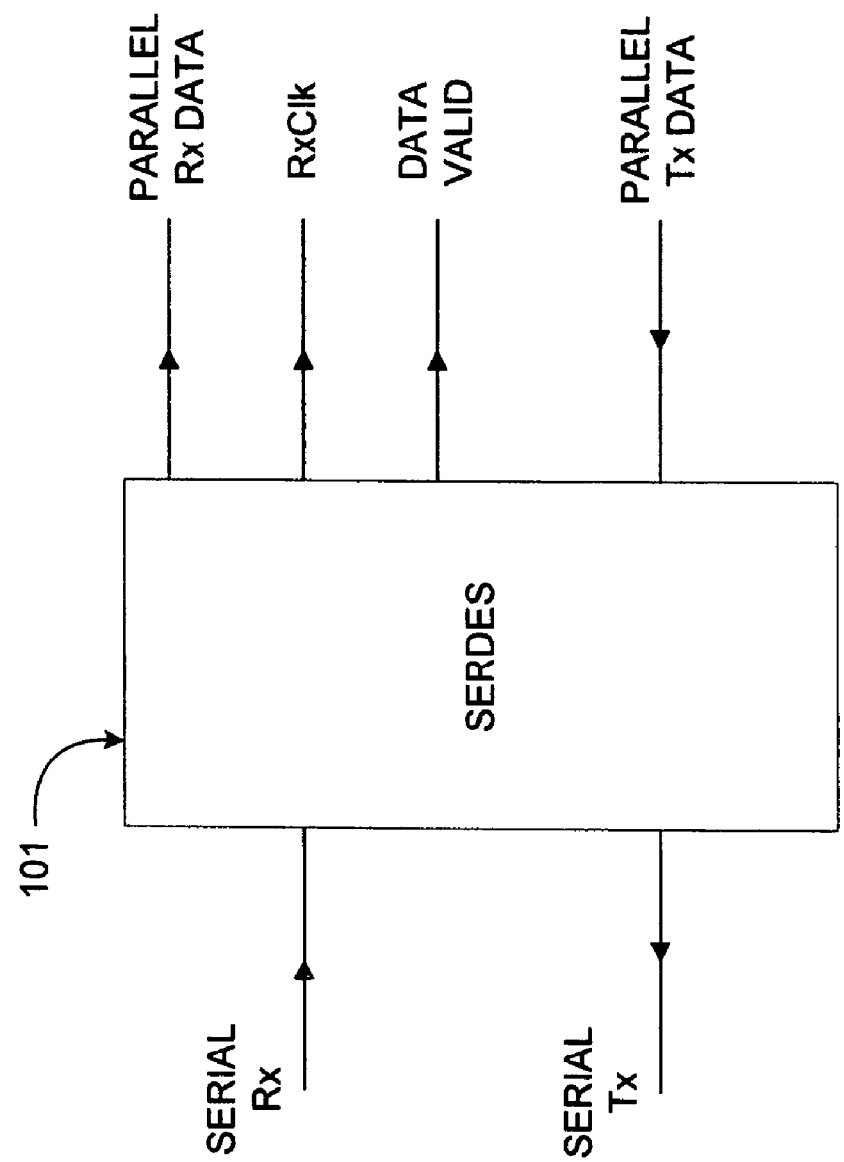
FIG. 11 is a schematic representation of a serdes of a port of the switch of FIG. 10.

In the present example, each port 81 of the switch 26 has a serialiser/deserialiser (serdes) 101 for performing serialisation of the outbound data stream and deserialisation of the inbound data stream. As shown in FIG. 11, a serdes 11 has a parallel transmit (Tx) data input over which data for transmission is received in parallel in 10 bit units. The serdes 101 serialises the data, increasing the clock speed tenfold to take account of the reduced width of the data (1 bit rather than 10 bit) so that the overall data bandwidth remains constant. The serialised data is then output over the Infiniband link (serial Tx). On the receive side, the serdes 101 has an input for receiving serial received (Rx) data. This data is deserialised, and output as parallel Rx data. The serdes 101 also outputs the received data clock (RxCLK) which was recovered from the received data streani, at the low frequency corresponding to the parallel Rx data. Finally the serdes 101 outputs a data valid signal, indicating whether the data and clock being output from the serdes 101 are valid. This signal indicates invalid data until comma detection circuitry has detected a received comma signal and caused the correct alignment of the data and has selected the correct low frequency clock for that data.

Figure 12:
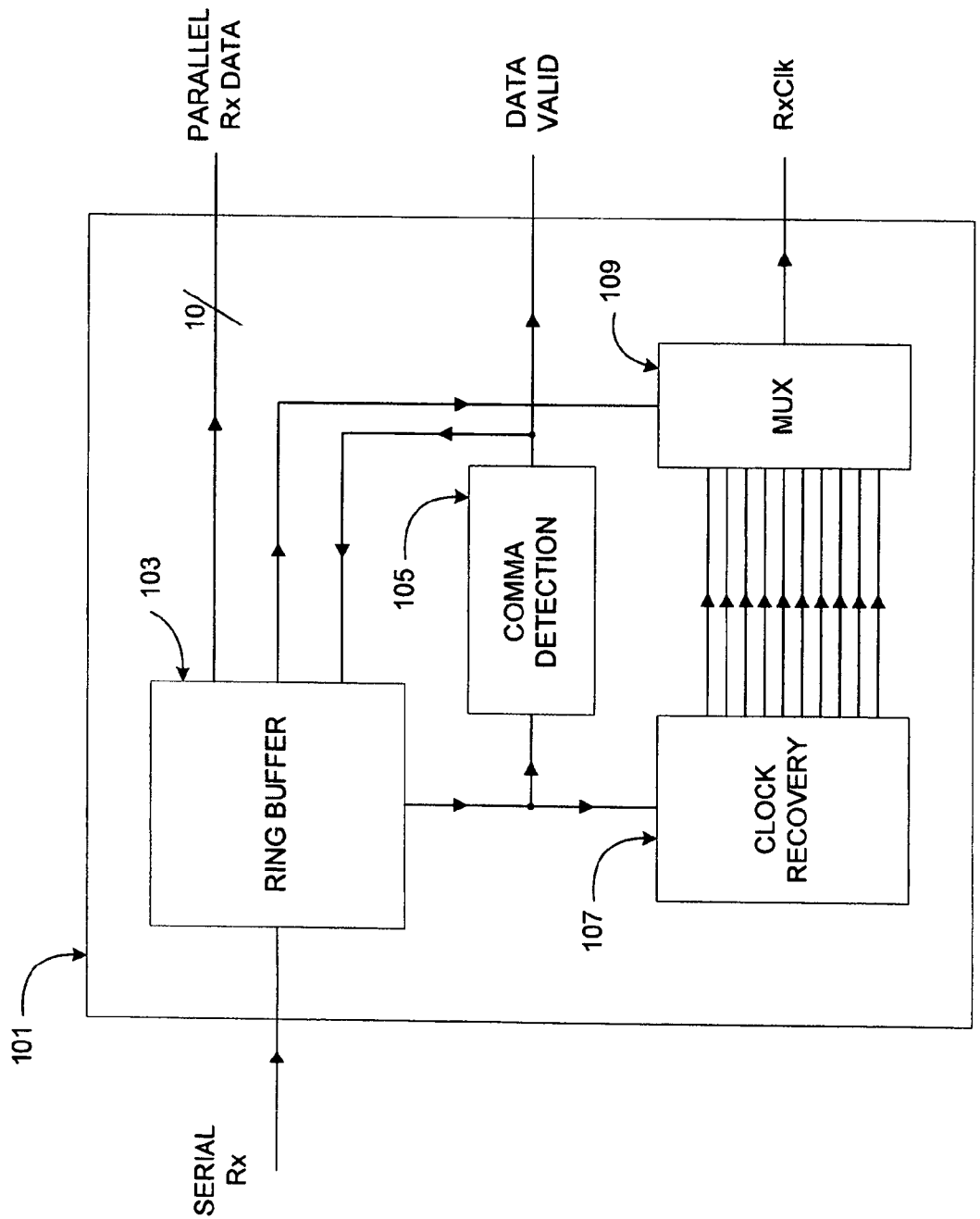
FIG. 12 is a schematic representation of components of a deserialiser part of the serdes of FIG. 11.

FIG. 12 shows a deserialiser part of the serdes 101. As shown in FIG. 12, the serdes 101 has a ring buffer 103 into which the received data is written. The ring buffer 103 then outputs data over a 10 bit parallel bus (Parallel Rx Data). The data written into the ring buffer is also accessed by a comma detection unit 105. This unit analyses the received data to watch for a comma symbol. The ring buffer 103 is illustrated in more detail in FIG. 13.

Figure 13:
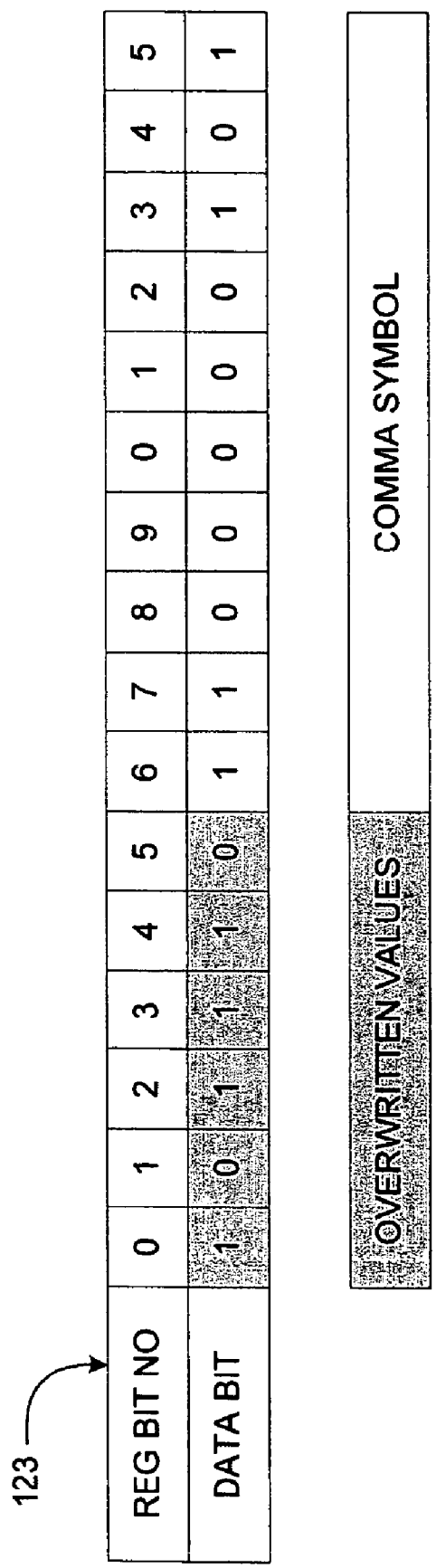
FIG. 13 is a schematic representation of a buffer of the serdes of FIG. 11.

In FIG. 13, an example current register content is illustrated. The shaded data bits represent previous values of the register (now overwritten). The unshaded values represent the current data values. In the example of FIG. 13, the current data values constitute a comma symbol. Upon detection of this comma symbol by the comma detection unit 105, the comma detection unit asserts the data valid output to indicate that the data is now valid. At the same time, the data valid output is fed to the ring buffer 103 to cause the output parallel data to be started from the correct register bit number for the output data to be valid. In the present example, the correct register bit number is bit number 6.

Figure 14:
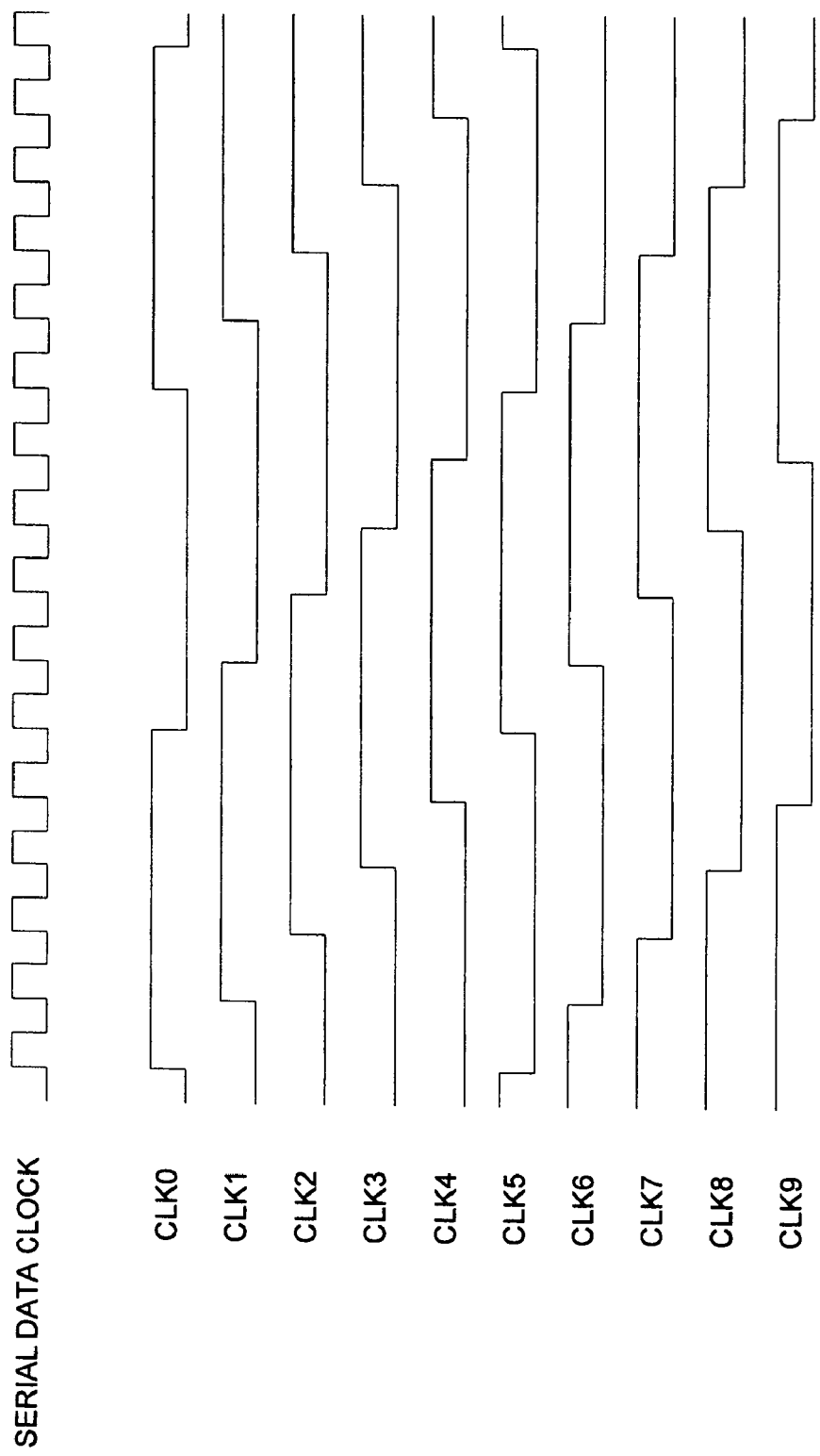
FIG. 14 is a timing diagram showing the possible low frequency clocks which can be retrieved from a high frequency clock.

Referring again to FIG. 12, the data being written into the ring buffer is also accessed by a clock recovery unit 107. This operates by detecting the bit transitions in the received data stream. Thus the serial data clock (high frequency) of the received data can be reconstructed. The serial data clock is illustrated in FIG. 14. Also illustrated in FIG. 14 are the ten possible low frequency clocks which can be generated from the serial data clock (CLK0–CLK9). Each of these low frequency clocks is a potential valid clock for the data being received.

In the present example, in order to minimise the latency of the serdes 101, the clock recovery unit 107 generates all ten of the possible clocks and outputs them to a multiplexer 109. The multiplexer 109 received a selection input from the ring buffer 103, which selection input selects between the ten candidate clocks on the basis of the determined starting register bit number. Thus in the present example, where the starting resister bit number is bit number 6, CLK6 would be selected at the multiplexer 109 and thus be output from the serdes 101 as RxClk.

By generating all ten possible clocks and selecting between them, the arrangement of the present example optimises the serdes for latency by ensuring that there is no need to wait one low frequency clock cycle while the correct low frequency clock is generated after detecting a comma symbol. As will be appreciated, the selection of the register start bit at the ring buffer 103 and subsequent output selection at the multiplexer 109 can be performed extremely fast relative to the low frequency clock, thereby ensuring that valid data can be output on the parallel Rx data bus in combination with a valid RxClk on the first low frequency clock cycle following the comma symbol detection.

Thus there has now been described an example of a comma detection and alignment arrangement for an Infiniband port. The arrangement provides a latency optimised solution for performing comma detection, valid data forwarding and valid clock generation.

Although the embodiments above have been described in considerable detail, numerous variations and modifications will become apparent to those skilled in the art once the above disclosure is fully appreciated. It is intended that the following claims be interpreted to embrace all such variations and modifications as well as their equivalents.

What is claimed is:

1. A data input port comprising:
   an input buffer for receiving a serial data stream and for outputting a parallel data stream comprising multiple bits of said serial data stream in parallel groups;
   a first detector unit for detecting a predetermined symbol in the data stream, and for outputting a positive detection status signal to the input buffer in response to a detection of said predetermined symbol; and
   a second detector unit for detecting data transitions in the serial data stream for generating a serial data clock signal and for generating a plurality of candidate clocks from the serial data clock signal, each candidate clock having the same frequency, the frequency being less than the frequency of the serial data clock signal;
   wherein the input buffer is operable to, upon reception of the positive detection status signal from the first detector unit, select a data ordering start position within the buffer for output of the parallel data stream and for outputting a clock selection signal for selecting between the plurality of candidate clocks on the basis of the selected data ordering start position.

2. The port of claim 1, wherein a group of bits outputted in the parallel data stream during the first selected candidate clock cycle following selection of the data ordering start position is a valid group of bits.

3. The port of claim 2, wherein the first detector unit is operable to provide the positive detection status signal as an output to indicate validity of the data in the parallel data stream.

4. The port of claim 1, wherein each group in the parallel data stream comprises 10 bits.

5. The port of claim 1, wherein the number of candidate clocks is ten, and the frequency of each candidate clock is one tenth of the frequency of the serial data clock signal.

6. The port of claim 1, wherein the input buffer is a ring buffer.

7. The port of claim 6, wherein the ring buffer has a number of data spaces equal to the size of the parallel groups.

8. The port of claim 1, wherein the port is an Infiniband port.

9. An Infiniband device comprising the port of claim 8.

10. A data input port comprising:
input buffer means for receiving a serial data stream and for outputting a parallel data stream comprising multiple bits of said serial data stream in parallel groups;
first detector means for detecting a predetermined symbol in the data stream, and for outputting a positive detection status signal to the input buffer means in response to a detection of said predetermined symbol; and
second detector means for detecting data transitions in the serial data stream for generating a serial data clock signal and for generating a plurality of candidate clocks from the serial data clock signal, each candidate clock having the same frequency, the frequency being less than the frequency of the serial data clock signal;
wherein the input buffer means is operable to, upon reception of the positive detection status signal from the first detector unit, select a data ordering start position within the buffer for output of the parallel data stream and for outputting a clock selection signal for selecting between the plurality of candidate clocks on the basis of the selected data ordering start position.

11. An Infiniband device comprising an input port having a serialiser/deserialiser, the serialiser/deserialiser comprising: a data buffer for storing data from a received serial data stream and for outputting the stored data in parallel groups; a code detector for detecting a predetermined code pattern in the serial data stream and generating a code detection output in response thereto; and a transition detector for detecting transitions in the serial data stream and reconstructing a serial data clock therefrom, and for generating a plurality of parallel data clocks from the serial data clock, each parallel data clock having a different phase; the data buffer being responsive to the code detection output to adjust a parallel data group start position within the serial data stream and to select a one of the reduced frequency clocks having a phase corresponding to the adjusted parallel data group start position.

12. The device of claim 11, wherein the parallel data clocks each have a frequency of $\frac{1}{10}$ times the frequency of the serial data clock.

13. The device of claim 11, wherein the phase shift between the parallel data clocks is one serial data clock cycle.

14. The device of claim 11, wherein each parallel data group comprises 10 bits.

15. The device of claim 11, wherein the data buffer is a ring buffer.

16. The device of claim 15, wherein the buffer has a number of bit positions equal to the number of bits in each parallel data group.

17. The device of claim 11, wherein the code detection output can be used to indicate a validity status of the parallel data groups.

18. The device of claim 11, wherein a parallel data group and selected parallel data clock output from the buffer and transition detector respectively, in a first selected parallel data clock cycle after a detection of the predetermined code at the code detector, are both valid.

19. The device of claim 11, wherein the device is a switch.

20. The device of claim 11, wherein the device is a router.

* * * * *